(12) United States Patent
Home

(10) Patent No.: US 6,863,257 B2
(45) Date of Patent: Mar. 8, 2005

(54) RANGE BURNER CONTROL VALVE SHUTTER

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 14 days.

(21) Appl. No.: 10/622,539

(22) Filed: Jul. 21, 2003

(65) Prior Publication Data

US 2005/0017210 A1 Jan. 27, 2005

(51) Int. Cl.[7] .................................................. F16K 5/10
(52) U.S. Cl. ..................................... 251/209; 251/310
(58) Field of Search ................................. 251/310, 209

(56) References Cited

U.S. PATENT DOCUMENTS

| | | | | |
|---|---|---|---|---|
| 1,754,388 A | * | 4/1930 | Harper | 251/311 |
| 1,974,975 A | * | 9/1934 | Louis et al. | 251/309 |
| 2,573,502 A | * | 10/1951 | Smith | 251/311 |
| 3,818,937 A | * | 6/1974 | LaGanke | 251/310 |
| 4,721,066 A | * | 1/1988 | Newman et al. | 126/247 |
| 5,009,393 A | * | 4/1991 | Massey | 251/209 |
| 5,238,398 A | * | 8/1993 | Harris | 251/205 |
| 6,520,481 B2 | * | 2/2003 | Harneit | 251/310 |
| 6,808,162 B2 | * | 10/2004 | Tranovich et al. | 251/209 |

* cited by examiner

Primary Examiner—John Bastianelli
(74) Attorney, Agent, or Firm—Leong C. Lei

(57) ABSTRACT

An improved structure of a range burner control knob valve shutter by providing in recess on the peripheral of the shutter an air pocket containing a larger port and a smaller port; an oil guide groove being provided to the air pocket which is allowed to move in and out from both edges of an air inlet to the control knob and to protrude from the edge of the air pocket in defining a flow guide profile; the smaller port being provided at a higher position at some position from the oil groove; the outer surface of the shutter being greased before being installed in the range burner control valve to complete the assembly with closed spacing; diluted oil over time being scratched by the edge of the profile and settling down at the very bottom of the groove without blocking the smaller port thus preventing the malfunctioning of mild fires and contamination during combustion.

3 Claims, 4 Drawing Sheets

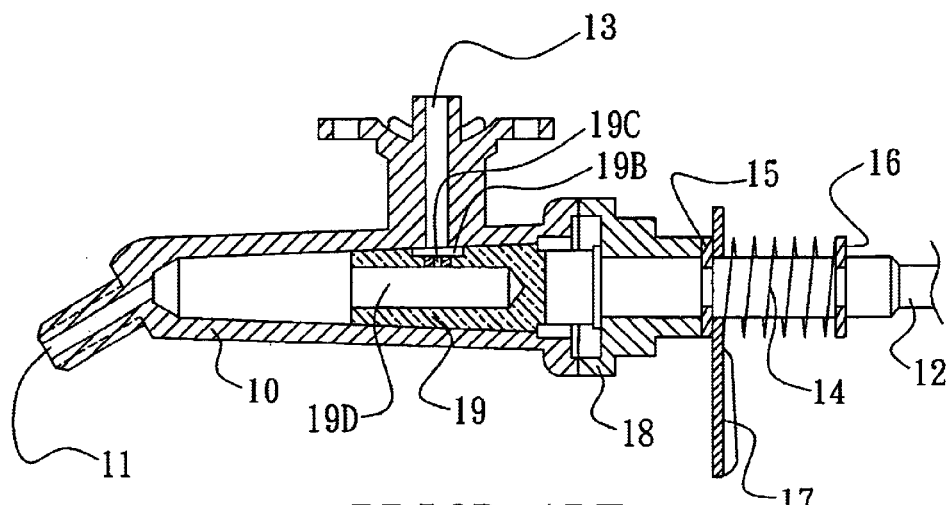
PRIOR ART
FIG. 3
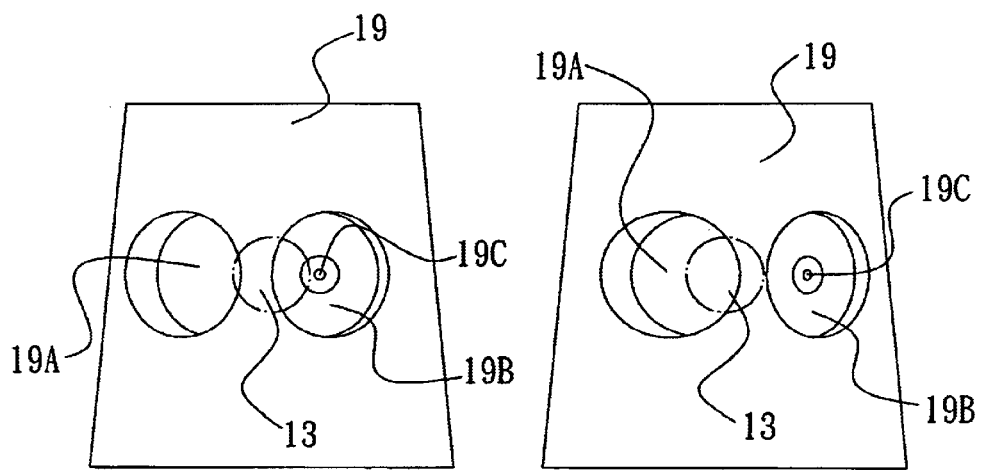
PRIOR ART
FIG. 4
PRIOR ART
FIG. 5

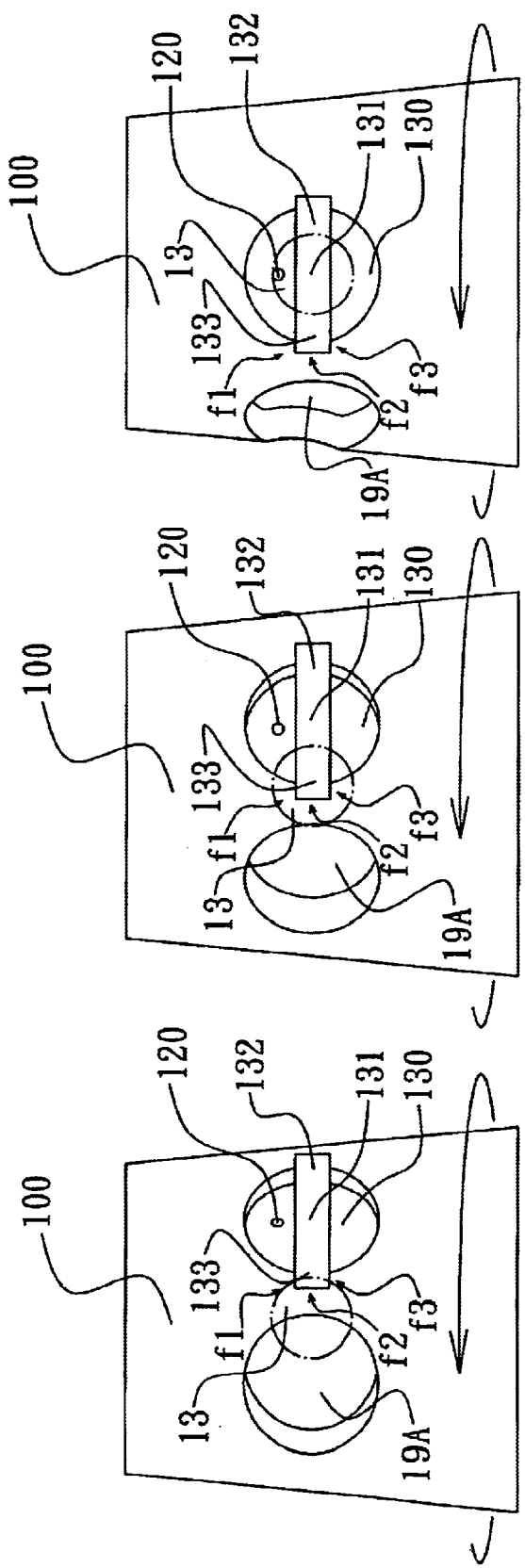

RANGE BURNER CONTROL VALVE SHUTTER

BACKGROUND OF THE INVENTION (a) Field of the Invention

The present invention is related to an improved structure of a control valve shutter for a burner (inter alia a stove range), and more particularly, to one that prevents grease oil from contaminating combustion air passages by guiding the diluted grease into a collector provided in an area which will not affect the airports enabling the burning of a flame.

(b) Description of the Prior Art

Ever since the use of gas as a fuel for ranges, air pollution resulting from burning coal and wood has been significantly reduced. However, even with the use of fuels such as natural gas, which will not generate smoke while burning on the range, zero combustion pollution is not possible, and the combustion efficiency of the range is compromised if foreign matters block the air passage inside the range.

The blocked air passage inside the range most frequently takes place at the shutter. As illustrated in FIG. 1 of the accompanying drawings for a general structure of a control knob on a conventional range, an air inlet pipe 13 connected to a gas source 50 protrudes from one end of a valve casing 10 and a valve shaft 12 connected to a control knob 30 extends from another end of the valve casing 10. The control knob 30 protrudes out of the control panel for regulating the air amount by dialing the valve shaft 12, an air outlet pipe 11 vertically connected to a nozzle 20 is provided on the top of the valve casing 10 between the air inlet pipe 13 and the valve shaft 12. Upon removing a coil 14 on the valve shaft 12, C-shaped locking rings 15, 16, a fan-shaped electric ignition contact 17 and a casing cover 18 as illustrated in FIG. 2, the valve shaft 12 and a shutter 19 internally connected to the valve shaft 12 inside the valve casing 10 can be pulled out. Further illustration is given in FIG. 3, where the locations of all the components in the periphery of the shutter 19 that admits the gas flux when the valve shaft 12 is turned are relative to the opening of the air inlet pipe 13, is provided in recess an air outlet port 19A for the larger flame and an air outlet port 19C for the smaller flame. The air outlet port 19C contains an air pocket 19B. Both of the air outlet ports 19A and 19C are arranged in parallel formation and abutted to each other. Both air outlet ports 19A and 19B are connected through the interior of the shutter 19 and an air passage 19D connecting through the air inlet pipe 13. The air outlet port 19C is provided at the lowest position at the center of the air pocket 19B. When the valve shaft is rotated to turn around the shutter 19 inside the valve casing, any place between the air outlet port 19A and the air pocket 19B can be regulated to a point below the air inlet pipe 13 to the control valve of the range. As illustrated in FIG. 4, when the air pocket 19B is aligned to the opening of the air inlet pipe 13C to such an extent that the flux there is greater than that of the air outlet port 19A, a smaller amount of gas flows to the nozzle 20 (illustrated in FIG. 1) through the air inlet pipe 13 to ignite the smaller flame. As illustrated in FIG. 5, when the air outlet port 19A is aligned to the opening of the air inlet pipe 13C to the extent that the flux there is greater than that of the air pocket 19B, a large amount of gas flows to the nozzle 20 (illustrated in FIG. 1) from the air outlet port 19A through the opening of the air inlet pipe 13 on the control valve of the range to ignite the larger flame.

However, to allow sufficient rotation space and spacing sealing for the shutter 19, the shutter 19 must be applied with a film of lubrication oil before being placed in the valve casing. As time passes, any grease oil therein will deteriorate and become diluted. Therefore, the grease oil film on the surface of the shutter will become diluted and flow into the air pocket 19B to block the air outlet port 19C, resulting in the malfunction of the air outlet port 19C to preventing the provision of a sufficient amount of flame. Even though the shutter may be removed for clearing purposes by wiping off the oil stains accumulated on the air outlet port 19C and re-applying a new film of grease oil, the consumer may blame this malfunction on the quality of the control knob which is detrimental to the image of the range product.

Furthermore, upon being sprayed into the nozzle through the air inlet pipe and the air outlet port 19C, the gas will be contaminated by the lubricant oil stains found on the air outlet port 19C resulting in combustion pollution as the air passage inside the range is blocked by foreign matter as described above.

SUMMARY OF THE INVENTION

The primary purpose of the present invention is to provide an improved structure of a shutter in a control valve of a range that is capable of maintaining a well facilitated air passage to maintain the normal function of an air outlet port for the smaller flame by stopping the diluted lubrication oil applied on the surface of the shutter from flowing into the air pocket. To achieve that purpose, in the middle section where an air pocket being provided in a recess connected through the air outlet to the control valve of the range, a deeper oil groove than the air pocket is provided; the oil groove further moves in from the center and out from both edges each at an ascending inclination of the air outlet to a control valve of the range for the oil groove to stick out of the circumference of the air pocket to define an air guide profile; the air outlet port for the smaller flame is provided at a higher location in the air pocket at some distance from the oil groove so that the diluted lubricant oil from the shutter, applied on its surface with lubricant oil then packed in the control valve of the range completed with the assembly, will be guided through the oil groove profile and accumulated at the very bottom of the oil groove without flowing to block the air outlet port for the smaller flame.

Another purpose of the present invention is to provide an improve structure of a shutter in a control valve of a range that is capable of maintaining combustion free of pollution for the range. To achieve this purpose, the diluted lubricant oil is guided to the very bottom of the oil groove without contaminating and blocking the air outlet port for the smaller flame and is prevented from mixing with the gas delivered to a nozzle through the air outlet port for the smaller flame.

The foregoing object and summary provide only a brief introduction to the present invention. To fully appreciate these and other objects of the present invention as well as the invention itself all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 is a sectional view of the control valve of the range of the prior art.

FIG. 4 is a schematic view of the shutter of the prior art being dialed for ignition of a smaller flame.

FIG. 5 is a schematic view of the shutter of the prior art being dialed for ignition of a larger flame.

FIG. 7 is a schematic view of the shutter of the preferred embodiment being dialed for ignition of a larger flame.

FIG. 8 is a schematic view showing that the shutter illustrated in FIG. 6 being dialed for an oil groove aligned at an air outlet port FIG. 9 is a schematic view showing that the shutter illustrated in FIG. 6 being dialed for ignition of a smaller flame.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
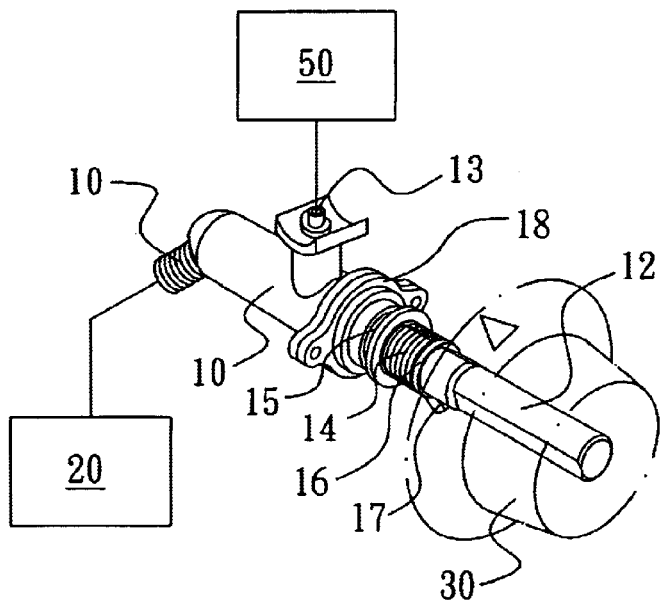
FIG. 1 is a perspective view of a control valve of a range of the prior art.
Figure 2:
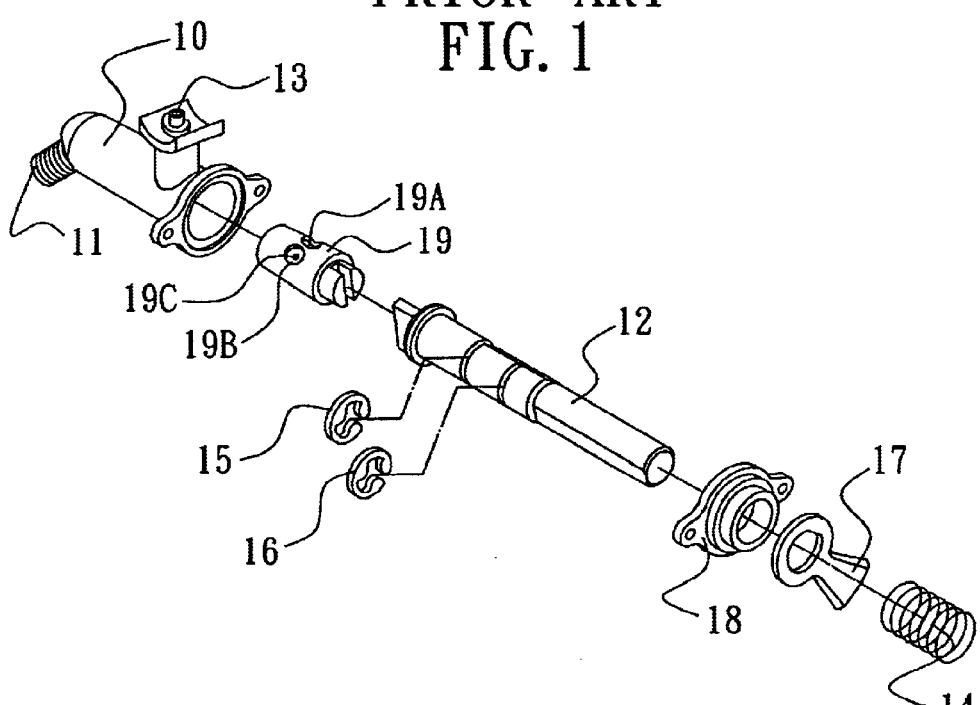
FIG. 2 is an exploded view of the control valve of the range of the prior art.
Figure 6:
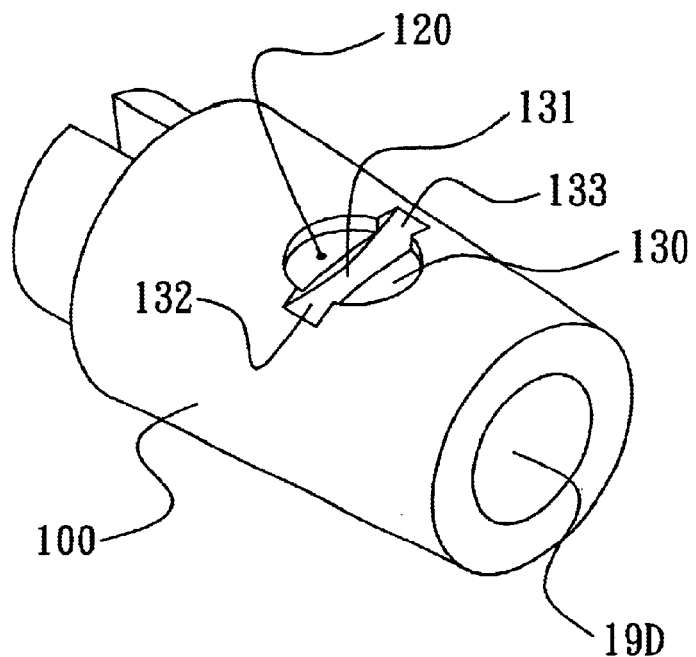
FIG. 6 is a perspective view of a preferred embodiment of the present invention.

Referring to FIG. 6 for a perspective view of an improved structure of a shutter to a control valve of a range of a preferred embodiment of the present invention, wherein, an air outlet port for the larger flame and another air outlet port 120 for the smaller flame containing an air pocket 130 being provided in recess to the peripheral of the shutter 100. An oil groove 131 deeper in recess than that of the air pocket 130 is provided laterally in the middle section where the air pocket 130 passes through an air inlet port to the control valve of the range (the air outlet air port, and the air inlet port of the control valve of the range are not illustrated, please refer to FIGS. 3, 7, 8 and 9.). The oil groove 131 advances further to the center then moves out of both edges at an ascending inclination of the air inlet port to the control valve of the range to further protrude from the circumference of the air pocket edge to define a flow guide profiles 132, 133 for each. As illustrated, the oil groove 131 relates to a groove in a profile with an arc-cut groove in a recess and the air outlet port 120 for the smaller flame is provided a higher location in the air pocket 130 at a distance from the oil groove 131.

Within such a configuration, grease oil is applied on the surface of the shutter 100 and placed into the control valve of the range to complete sealed packing. After a certain time of operation, molecules f1, f2 and f3 from the diluted grease oil film as illustrated in FIGS. 7, 8 and 9 first contact the edges of the guide groove profiles 132, 133 at the same time the shutter 100 is dialed in the status whenever the oil groove 130 is rotated to the upper spherical position in a circular motion. The diluted oil is scratched and flows down to the very bottom for accumulation at the center of the oil groove 131. Whereas only a small amount of lubricant oil is applied to the surface of the shutter 100 to form a film for the purpose of sealed packing, a proper depth cut for the oil groove 131 will be sufficient to accommodate the diluted oil without overflowing anywhere outside the oil groove 131. As the air outlet port 120 for the smaller flame is provided at a higher location in the air pocket 130 at a distance from the oil groove 131, the air outlet port 120 will be inclined away from the route where the diluted oil accumulates at the center bottom of the oil groove 131 to avoid blocking the air outlet port 120 for the smaller flame, and thus the air outlet port 120 will maintain a clean status in achieving good combustion for a long time.

Figure 10:
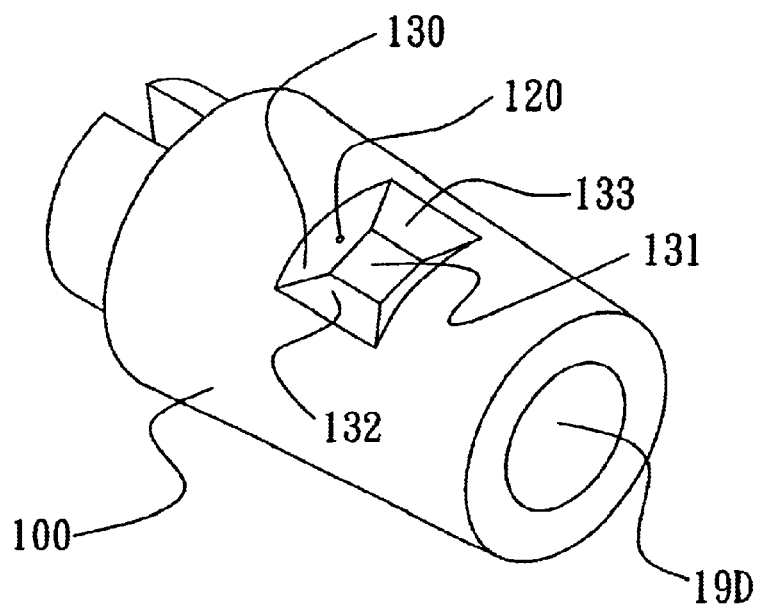
FIG. 10 is a perspective view of another preferred embodiment of the present invention.

Now referring to FIG. 10 for another preferred embodiment of the present invention, wherein both of the air pockets and the oil groove form an upside-down trapezoid groove, and the air outlet port 120 for the smaller flame is provided at a higher location in the air pocket 130 at some distance from the oil groove to achieve the same benefit of maintaining a long term of clean combustion.

The present invention, by effectively guiding the diluted lubricant oil to the air outlet port for the smaller flame and accumulating in an area not causing blockage to the air outlet port for the smaller flame, so correcting the defects including the malfunction of the smaller flame and combustion pollution found with the prior art is innovative and complies with the requirements of patent law. Therefore, this application if duly filed accordingly.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention

I claim:

1. An improved structure of a shutter to a control valve of a range burner control, wherein, an air outlet port for the larger flame and another air outlet port for the smaller flame containing an air pocket is provided in recess to the peripheral of the shutter that controls the gas flux in the control valve of the range when a control knob is dialed, characterized by a deeper oil groove than the air pocket being provided; the oil groove further moving in from the center and out from both edges each at an ascending inclination from the air outlet to a control valve of the range for the oil groove to protrude of the circumference of the air pocket to define an air guide profile; and the air outlet port for the smaller flame being provided at a higher location in the air pocket at a distance from the oil groove.

2. An improved structure of a shutter to a control valve of a range as claimed in claim 1, wherein, the oil groove relates to a groove in a profile with an arc-cut groove in recess.

3. An improved structure of a shutter to a control valve of a range as claimed in claim 1, wherein, both the air pocket and the oil groove form an upside-down trapezoid groove.

* * * * *